(12) United States Patent
Watkins et al.

(10) Patent No.: US 8,214,128 B2
(45) Date of Patent: Jul. 3, 2012

(54) DIESEL FUEL ENGINE INJECTION SYSTEM AND METHOD THEREFOR

(75) Inventors: Derek Robert Watkins, Dungog (AU); Bruce Robert Watkins, Dungog (AU); Keith Murray Rumbel, Dungog (AU)

(73) Assignee: Gas Tek Solutions Pty. Ltd., Dungog, New South Wales (AU)

( * ) Notice: Subject to any disclaimer, the term of this patent is extended or adjusted under 35 U.S.C. 154(b) by 551 days.

(21) Appl. No.: 12/066,033

(22) PCT Filed: Nov. 28, 2007

(86) PCT No.: PCT/AU2007/001830
§ 371 (c)(1), (2), (4) Date: Jun. 17, 2008

(87) PCT Pub. No.: WO2008/064415
PCT Pub. Date: Jun. 5, 2008

(65) Prior Publication Data
US 2010/0217500 A1    Aug. 26, 2010

(30) Foreign Application Priority Data

Aug. 20, 2007 (AU) ................ 2007904436
Nov. 20, 2007 (AU) ................ 2007906316

(51) Int. Cl.
*B60T 7/12* (2006.01)
(52) U.S. Cl. ............ 701/103; 123/525; 123/27 GE
(58) Field of Classification Search ........ 123/525, 123/527, 530, 27 GE; 701/103
See application file for complete search history.

(56) References Cited

U.S. PATENT DOCUMENTS

| 4,606,322 | A | | 8/1986 | Reid et al. |
|---|---|---|---|---|
| 5,673,673 | A | * | 10/1997 | Beck ........................ 123/527 |
| 6,237,575 | B1 | * | 5/2001 | Lampert et al. ............ 123/520 |
| 7,100,577 | B2 | * | 9/2006 | Mumford et al. ........... 123/498 |
| 7,463,967 | B2 | * | 12/2008 | Ancimer et al. ............ 701/104 |
| 2005/0121005 | A1 | | 6/2005 | Edwards |
| 2005/0205021 | A1 | | 9/2005 | Shute |
| 2005/0284451 | A1 | | 12/2005 | Uhde et al. |

(Continued)

FOREIGN PATENT DOCUMENTS

NL      1017772      12/2002

(Continued)

OTHER PUBLICATIONS

Needham, Norm, "LPG for Diesels," retrieved from the Internet: http://www.overlander.com.au/equipment/index/full/89/LPG-For-Diesels, pp. 3 (May 2, 2008).

(Continued)

*Primary Examiner* — John Kwon
(74) *Attorney, Agent, or Firm* — Dicke, Billig & Czaja, PLLC (57) ABSTRACT

Disclosed is a method of injecting LPG gas into a diesel fuel engine for combustion with diesel fuel therein. One aspect includes injecting LPG gas into an air-stream of an engine air intake or manifold, measuring the percentage of LPG gas injected into the airstream or other efficiency gauge, varying the rate of injection of LPG gas into the airstream in response to the measured percentage of LPG gas therein and injecting the LPG gas at a pre-determined rate so as to maintain an LPG gas concentration in the air intake stream in the range of 0.2% to 0.6% by volume of LPG gas.

7 Claims, 7 Drawing Sheets

U.S. PATENT DOCUMENTS

2007/0157912 A1   7/2007   Ritter et al.

FOREIGN PATENT DOCUMENTS

| WO | 03048555 | 6/2003 |
|---|---|---|
| WO | 2005064144 | 7/2005 |
| WO | 2007006069 | 1/2007 |
| WO | 2008064415 | 6/2008 |
| WO | 2008135715 | 11/2008 |

OTHER PUBLICATIONS

Written Opinion for International Application No. PCT/AU2007/001830 dated Feb. 19, 2008 (3 pages).

International Search Report for International Application No. PCT/AU2007/001830 dated Feb. 19, 2008 (2 pages).

International Preliminary Report on Patentability for International Application No. PCT/AU2007/001830 date of Issuance of report Feb. 24, 2010 (4 pages).

Supplementary European Search Report for Application No. EP 07 81 5630 dated Jan. 17, 2011 (6 pages).

Written Opinion for International Application No. PCT/AU2010/000019 dated Feb. 18, 2010 (4 pages).

International Search Report for International Application No. PCT/AU2010/000019 dated Feb. 18, 2010 (3 pages).

International Preliminary Report on Patentability for International Application No. PCT/AU2010/000019 date of Completion of Report May 3, 2011 (8 pages).

* cited by examiner

FIG. 1

CONNECTOR PIN-OUTS

| PIN | DESCRIPTION | PIN | DESCRIPTION | PIN | DESCRIPTION | PIN | DESCRIPTION |
|---|---|---|---|---|---|---|---|
| 1 | BAT+<br>See PIN 31 | 11 | BAT+<br>See PIN 31 | 21 | IGN+<br>Turns unit on | 31 | SUPPLY SELECT<br>OPEN = 24V<br>0V = 12V |
| 2 | OUT1 - RB4<br>Fuel enable. | 12 | OUT1 - RB4 | 22 | 0V<br>Supply 0V | 32 | 0V |
| 3 | OUT2 - RB5<br>Injector 1 | 13 | OUT2 - RB5 | 23 | 0V<br>Injector 1 0V | 33 | 0V |
| 4 | OUT3 - RB6<br>Injector 2 | 14 | OUT3 - RB6 | 24 | 0V<br>Injector 2 0V | 34 | 0V |
| 5 | OUT4 - RB7<br>Status Lamp | 15 | OUT4 - RB7 | 25 | 0V<br>Status Lamp 0V | 35 | 0V |
| 6 | BAT+ Switched<br>Connects to fuel switch. | 16 | IN1 - RB1<br>Brake pedal switch to +BAT. Must be home to enable gas. | 26 | TACHO - RC0<br>Interrupt passes through schmitt trigger. | 36 | 0V<br>Spare |
| 7 | IN2 - RB2<br>Throttle home switch to +BAT. Must not be home to enable gas. | 17 | IN3 - AN3<br>LPG Manifold pressure Ok. | 27 | MANIFOLD - AN0<br>Manifold Pressure sensor signal. | 37 | 0V<br>Spare |
| 8 | 0V<br>Fuel gauge negative. Connects to ground when status enabled. | 18 | FUEL - AN2<br>Fuel gauge sensor. | 28 | TEMP - AN1<br>Gas regulator temperature.<br>1K=50°C | 38 | 0V<br>Spare |
| 9 | RX - RC7<br>RS232 IN to unit. | 19 | TX - RC6<br>RS232 OUT from unit. | 29 | +5V<br>Supply for Thermistor. | 39 | 0V<br>RS232 Ground. |
| 10 | TYPE-K −<br>Type-K Thermocouple negative. | 20 | TYPE-K +<br>Type-K Thermocouple positive.<br>SPI bus interface. | 30 | +5V<br>Supply for Manifold Pressure sensor. | 40 | 0V<br>Manifold Pressure sensor 0V |

| Pin No. | Description | Length |
|---|---|---|
| 1 | Battery 12 or 24 V supply via 7.5A fuse (same as pin 11) | 650 |
| 2 | Front, or under bonnet, AFSOD (gas lock off) | 2000 |
| 3 | Injector 1 + ve | 2000 |
| 4 | Injector 2 + ve | 2000 |
| 5 | Switched-ve for gas gauge (status indicator) | 3000 |
| 6 | Ignition + 12V Output to gauge, Ppne Sensor, throttle switch and pressure switch | 400 to splice S1 |
| 7 | Throttle switch input (NC at idle) | 3000 |
| 8 | Sender 0-2V input (spliced from tank sender) | 400 to splice S2 |
| 9 | Data cable Rx | 400 |
| 10 | EGT sensor –ve | |
| 11 | Battery 12V or 24V supply via 7.5A fuse (same as pin 1) | 650 |
| 12 | Rear AFSOD (tank lock off solenoid) | 650 |
| 13 | Injector 3 + ve | 2000 |
| 14 | Injector 4 + ve | 2000 |
| 15 | OEM 0-5V Map signal (input to SVI ECU) | 2000 |
| 16 | Rail pressure switch input (NC <psi) | 2000 |
| 17 | LPG select (Gas switch ON) input to ECU | 3000 |
| 18 | Ppne sensor signal input | 2000 |
| 19 | Data cable Tx | 400 |
| 20 | EGT sensor + ve | |
| 21 | Vehicle Ignition source | 3000 |
| 22 | Body earth 1 via 8mm lug | 650 |
| 23 | Injector 1 earth | 2000 |
| 24 | Injector 2 earth | 2000 |
| 25 | Emulated MAP signal output to OEM ECU | 2000 |
| 26 | Tacho pulse signal | 2500 |
| 27 | MAP/TP sensor 0-5V signal | 2000 |
| 28 | ECT sensor input | 2000 |
| 29 | ECT + 5V supply | 2000 |
| 30 | MAP/TP sensor, & Ppne Sensor +5V supply (300mm to splice S3) | 2000 |
| 31 | 12/24V power supply select (Open = 24V, Earth = 12V) | 650 |
| 32 | Body earth 2 via 8 mm lug | 650 |
| 33 | Injector 3 earth | 2000 |
| 34 | Injector 4 earth | 2000 |
| 35 | Front AFSOD earth | 2000 |
| 36 | Spare | |
| 37 | Tank AFSOD and sender earth | 6000 |
| 38 | Ppne Sensor earth | 2000 |
| 39 | Data cable earth | 400 |
| 40 | MAP/TP sensor earth | 2000 |

FIG. 6

Stored Values

|       | Min  | Max  |
|-------|------|------|
| REVS  | 900  | 2300 |
| LOAD  | 14   | 28   |
| GAS   | 37.3 | 90.5 |

Calaculated Values

| Load/RPM | 900  | 1100 | 1300 | 1500 | 1700 | 1900 | 2100 | 2300 |
|----------|------|------|------|------|------|------|------|------|
| 14       | 37.3 | 41.1 | 44.9 | 48.7 | 52.5 | 56.3 | 60.1 | 63.9 |
| 16       | 41.1 | 44.9 | 48.7 | 52.5 | 56.3 | 60.1 | 63.9 | 67.7 |
| 18       | 44.9 | 48.7 | 52.5 | 56.3 | 60.1 | 63.9 | 67.7 | 71.5 |
| 20       | 48.7 | 52.5 | 56.3 | 60.1 | 63.9 | 67.7 | 71.5 | 75.3 |
| 22       | 52.5 | 56.3 | 60.1 | 63.9 | 67.7 | 71.5 | 75.3 | 79.1 |
| 24       | 56.3 | 60.1 | 63.9 | 67.7 | 71.5 | 75.3 | 79.1 | 82.9 |
| 26       | 60.1 | 63.9 | 67.7 | 71.5 | 75.3 | 79.1 | 82.9 | 86.7 |
| 28       | 63.9 | 67.7 | 71.5 | 75.3 | 79.1 | 82.9 | 86.7 | 90.5 |

Actual Values

| Load/RPM | 900  | 1100 | 1300 | 1500 | 1700 | 1900 | 2100 | 2300 |
|----------|------|------|------|------|------|------|------|------|
| 14       | 37.3 | 41.2 | 44.7 | 48.6 | 52.5 | 56.5 | 60.0 | 63.9 |
| 16       | 41.2 | 44.7 | 48.6 | 52.5 | 56.5 | 60.0 | 63.9 | 67.8 |
| 18       | 44.7 | 48.6 | 52.5 | 56.5 | 60.0 | 63.9 | 67.8 | 71.8 |
| 20       | 48.6 | 52.5 | 56.5 | 60.0 | 63.9 | 67.8 | 71.8 | 75.3 |
| 22       | 52.5 | 56.5 | 60.0 | 63.9 | 67.8 | 71.8 | 75.3 | 79.1 |
| 24       | 56.5 | 60.0 | 63.9 | 67.8 | 71.8 | 75.3 | 79.1 | 82.9 |
| 26       | 60.0 | 63.9 | 67.8 | 71.8 | 75.3 | 79.1 | 82.9 | 86.7 |
| 28       | 63.9 | 67.8 | 71.8 | 75.3 | 79.1 | 82.9 | 86.7 | 90.5 |

$$GAS_{inject} = \left[\left[\frac{1}{2}\left(\left(\frac{Load_{current} - Load_{min}}{Load_{max} - Load_{min}}\right) + \left(\frac{REVS_{current} - REVS_{min}}{REVS_{max} - REVS_{min}}\right)\right)\right] * (GAS_{max} - GAS_{min})\right] + GAS_{min}$$

FIG.7

DIESEL FUEL ENGINE INJECTION SYSTEM AND METHOD THEREFOR

CROSS REFERENCE TO RELATED APPLICATION

This Utility Patent Application claims the benefit of the filing date of Australian Provisional Application No. 2007 904 436, filed Aug. 20, 2007 and Australian Provisional Application No. 2007 906 316, filed Nov. 20, 2007, and International Application No. PCT/AU2007/001830, filed Nov. 28, 2007, all of which are herein incorporated by reference.

FIELD OF THE INVENTION

Aspects of the invention relate to diesel fuel engines and to a method and system for injecting LPG gas into a diesel fuel engine for combustion therein.

Aspects have been developed primarily with respect to conventional diesel fuel engines and will be described hereinafter with reference to this application. However, it will be appreciated that the invention is not limited to this particular field of us and is also applicable to bio-diesel fuel engines, for example.

BACKGROUND

Diesel fuel engines are used widely in a large array of applications such as transport, heavy machinery or power generation and form a significant component of much equipment in agriculture, mining, construction, and freight and passenger transport. The recent significant rise in the price of diesel fuels has added to the importance of maintaining diesel fuel engine equipment so as to allow them to operate as efficiently as possible. Relatively small efficiency gains can lead to a dramatic decrease in fuel consumption and equipment wear, together with corresponding reductions in pollution and other emissions.

It is known that a combustible gas can be added to a diesel fuel engine air intake. The mixture of the combustible gas with the conventional air intake enhances combustion conditions within the cylinder so as to increase efficiency of the diesel fuel combustion process. In the prior art, a combustible gas source, for example an LPG source, is connected to an air inlet of a diesel fuel engine and injected by means of a solenoid valve, at some predetermined rate. This is drawn into the engine air intake stream and mixed in a venturi. The suction of the venturi is provided by the manifold vacuum or pressure difference.

Unfortunately, simple factors in engine performance deterioration significantly reduce the efficiency of the combustible gas injection and hence engine combustion. For example, as the diesel engine is operated, its air filter will naturally reduce the flow rate it allows into the engine air intake streams. As a result, the level of the combustible gas injected is not decreased proportionally. As a further result, the prior art start to decrease in any delivered efficiency gains and, depending on the deterioration of engine components such as the air filter, can do more harm than good by providing conditions in which the engine efficiency is lower with a combustible gas injection than without.

GENESIS

On aspect provides a method and system of injecting LPG gas into a diesel fuel engine for combustion with diesel fuel therein which will overcome or substantially ameliorate one or more of the disadvantages of the prior art, or to provide a useful alternative.

SUMMARY

According to a first aspect of the present invention there is provided a method of injecting LPG gas into a diesel fuel engine for combustion with diesel fuel therein, the method including:
  injecting LPG gas into an air-stream of an engine air intake or manifold;
  measuring the percentage of LPG gas injected into the airstream or other efficiency gauge;
  varying the rate of injection of LPG gas into the airstream in response to the measured percentage of LPG gas therein and injecting the LPG gas at a pre-determined rate so as to maintain an LPG gas concentration in the air intake stream in the range of 0.2% to 0.6% by volume of LPG gas.

According to a second aspect of the there is provided a method of injecting LPG gas into a diesel fuel engine for combustion with diesel fuel therein, the method including:
  measuring engine revolutions per minute of the engine ($REVS_{current}$) at predetermined revolutions from a minimum value at engine idle ($REVS_{min}$) to a maximum value ($REVS_{max}$) at wide open throttle;
  measuring the load of the engine ($Load_{current}$) at predetermined loads from an unloaded engine at idle ($Load_{min}$) through to a maximum loaded engine ($Load_{max}$);
  measuring an LPG gas flow rate of LPG gas into an airstream of an engine air intake so as to maintain the percentage of LPG gas mixed in the air intake to be in the range of 0.2% to 0.6% such that a minimum gas injection rate ($GAS_{min}$) corresponds to an idling engine under zero load.

According to a third aspect of the invention there is provided a system for injecting LPG gas into a diesel fuel engine for combustion with diesel fuel therein, the system including:
  an LPG gas injection device having an outlet disposed in fluid communication with a diesel fuel engine air-inlet and an inlet disposed in fluid communication with an LPG gas source;
  an LPG gas injection device controller configured to receive input indicative of an engine performance parameter and configured to the control LPG gas injection rate from the LPG gas injection device outlet such that the diesel engine air-inlet has LPG gas injected therein to form an air-LPG gas mixture having an LPG gas concentration of between 0.2% to 0.6%.

It can be seen there is provided a method and system of injecting LPG gas into a diesel fuel engine that improves combustion of diesel fuel in the engine so as to decrease the emissions from the diesel engines. The method and system are also configured to be operable in response to one or more of a variety of engine parameters and can be calibrated based on as little as two measured points.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

Embodiments of the invention will now be described, by way of example only, with reference to the accompanying drawings in which:

FIG. 1 is a schematic representation of a circuit board of a device configured for injecting LPG gas into a diesel fuel engine according to a embodiment of the;

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

According to an embodiment, there is disclosed a method and system of injecting LPG gas into a diesel fuel engine for combustion with diesel fuel in the engine. A diesel fuel engine is not illustrated.

The method includes injecting LPG gas into an air-stream of an engine air intake or directly into the manifold. The percentage of LPG gas injected into the airstream is measured. The rate of injection of LPG gas ($GAS_{inject}$) into the airstream is responsive to the measured percentage of LPG gas in the airstream. This is to allow injection of the LPG gas at a pre-determined rate so as to maintain an LPG gas concentration in the air intake stream in the range of 0.2% to 0.6% by volume of LPG gas. Ideally, the LPG gas concentration in the air intake stream is maintained at substantially 0.35% by volume.

The LPG gas is injected into the airstream of the engine air intake upstream of an engine cylinder inlet valve to provide best opportunity to mix the air and LPG gas. Measuring the percentage of LPG gas mixed into the airstream of the engine intake includes bleeding a portion of the mixed LPG-air intake stream and sampling this directly with an LPG gas sensor. Alternatively, the LPG-air intake mixture can be measured by combusting the bled LPG and measuring the products with a time delayed hot wire sensor. It will be appreciated that any preferred direct or secondary LPG concentration sensor can be used as desired.

Alternatively, the air intake mixture of the engine can be measured by measuring the efficiency of the engine by using a nitrous oxide (NOx) sensor in the exhaust manifold, a temperature sensor in the exhaust manifold or a gas sensor in the exhaust manifold.

The system uses the efficiency measurements to calculate LPG gas usage points and later extrapolates the required gas levels ($GAS_{inject}$) from these stored points to provide a faster LPG gas injection response time that by direct sensor measurement of the LPG gas mixture in the air intake stream. In this alternative embodiment, the use of stored points derived from efficiency measurements can be replaced by calculating and storing an electronic system map or table.

Operation of this method significantly improves the combustion efficiency of diesel fuel engines. This has the effects of reducing pollution and particulate matter, increasing power consumption and reducing fuel consumption.

Figure 1:
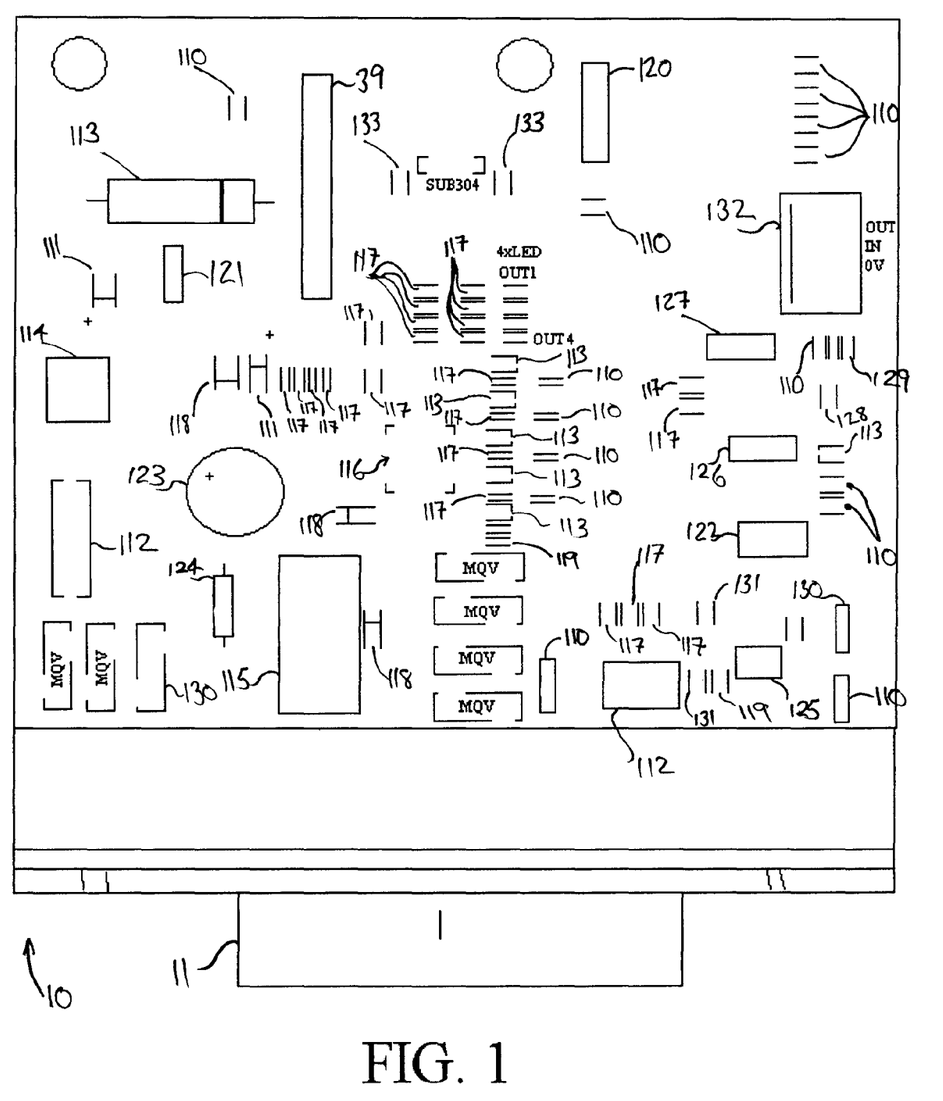
Figure 2:
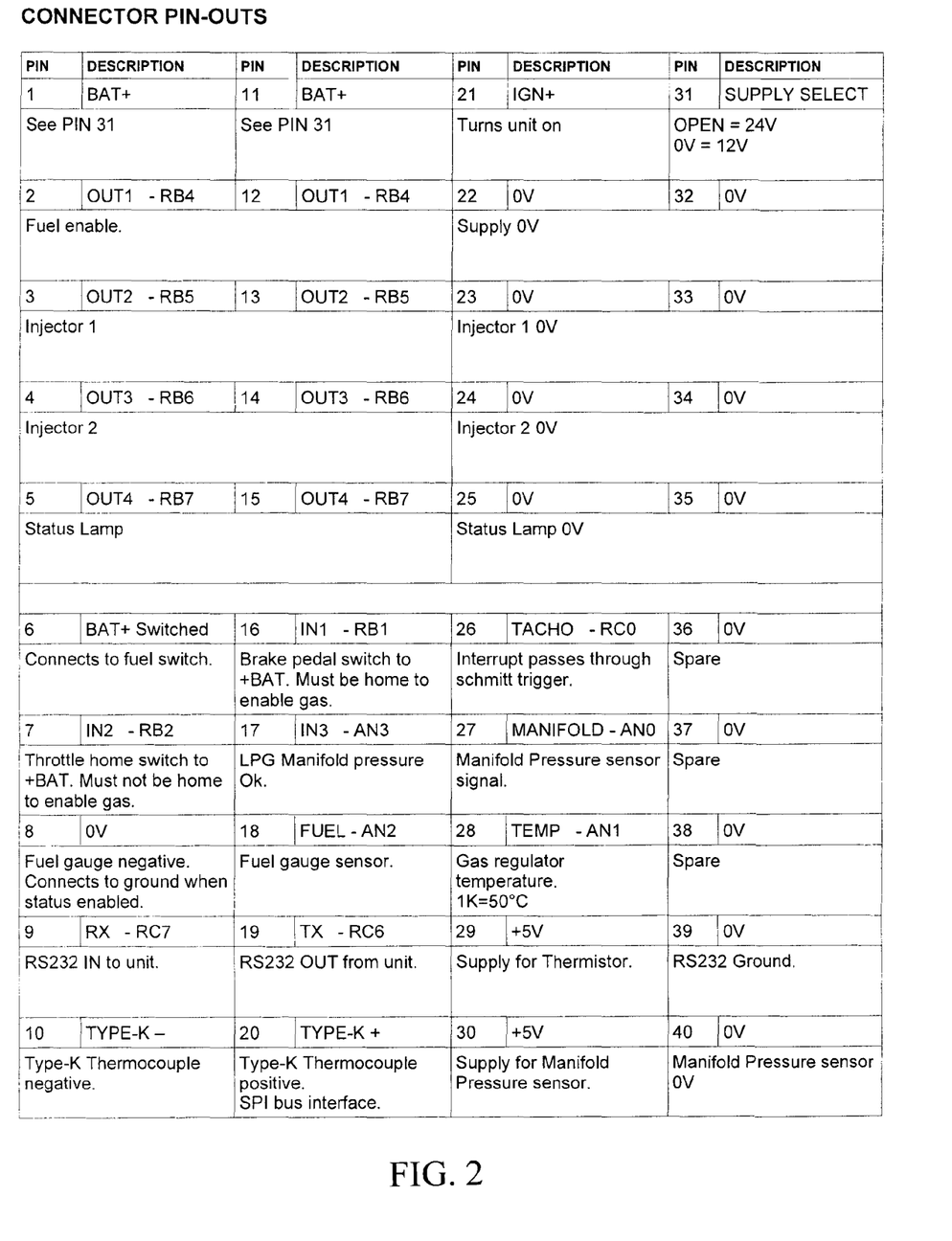
FIG. 2 is a connector pin description of the embodiment of FIG. 1.

Referring now to the embodiment illustrated in FIGS. 1 to 6, FIG. 1 is a schematic representation of a circuit board 10 of a device configured for injecting LPG gas into a diesel fuel engine so as to maintain an LPG gas concentration in the air intake stream in the range of 0.2% to 0.6% by volume of LPG gas. The circuit board 10 includes a connector 11 configured to mate with a corresponding connector (not illustrated) for example a DRC26-40, with 40 pins in the embodiment illustrated. FIG. 2 is a connector pin description of the connector 11 of FIG. 1.

Figure 3:
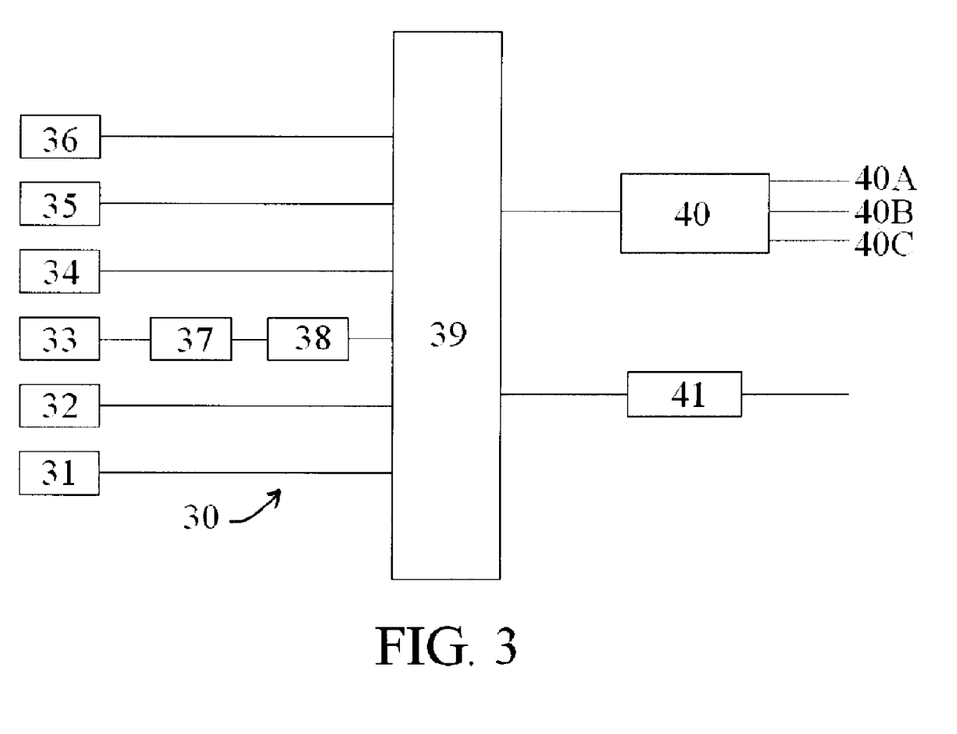
FIG. 3 is a block circuit diagram of the system of FIG. 1.

FIG. 3 illustrates a corresponding block circuit diagram of the system 30 of the circuit board 10 of FIG. 1 indicating the device input side (31 to 38) into a microprocessor 39 and control (40) and communications device (41). A quad channel high side relay 40 receives control signals from microprocessor 39 and sends a fuel enable signal to the output 40A to allow gas flow. Two outputs 40B and 40C provide signals to control the flow of LPG gas into the air intake of the diesel fuel engine.

A communications device 41 in the form of a MAX3232CSE transceiver provides an interface to the microprocessor 39. The system 30 is configured to receive inputs (31 to 36) in which the LPG gas temperature before or after mixing with the air intake stream is measured by sensor 31 in the form of a thermistor and sent to the microprocessor 39. The engine speed or RPM is measured via an engine alternator sensor 32, the engine manifold pressure via sensor 34 and the exhaust temperature is measured by a thermocouple 33 having a cold junction compensated thermocouple-digital converter 37 and EEPROM memory device 38 disposed intermediate the microprocessor 39.

An oxygen sensor 35 provides input into the microprocessor 39 indicating the oxygen levels of the air intake/LPG gas mixture. Switches 36 provide input into microprocessor 39 to turn the LPG gas injection off when a break pedal is depressed and/or the accelerator/throttle moved to a rest or home position. The sensed parameters on the input side of microprocessor 39 are indicative of the load and RPM of the engine. The system 30 is also disabled when the engine ignition system is turned off.

Figure 4:
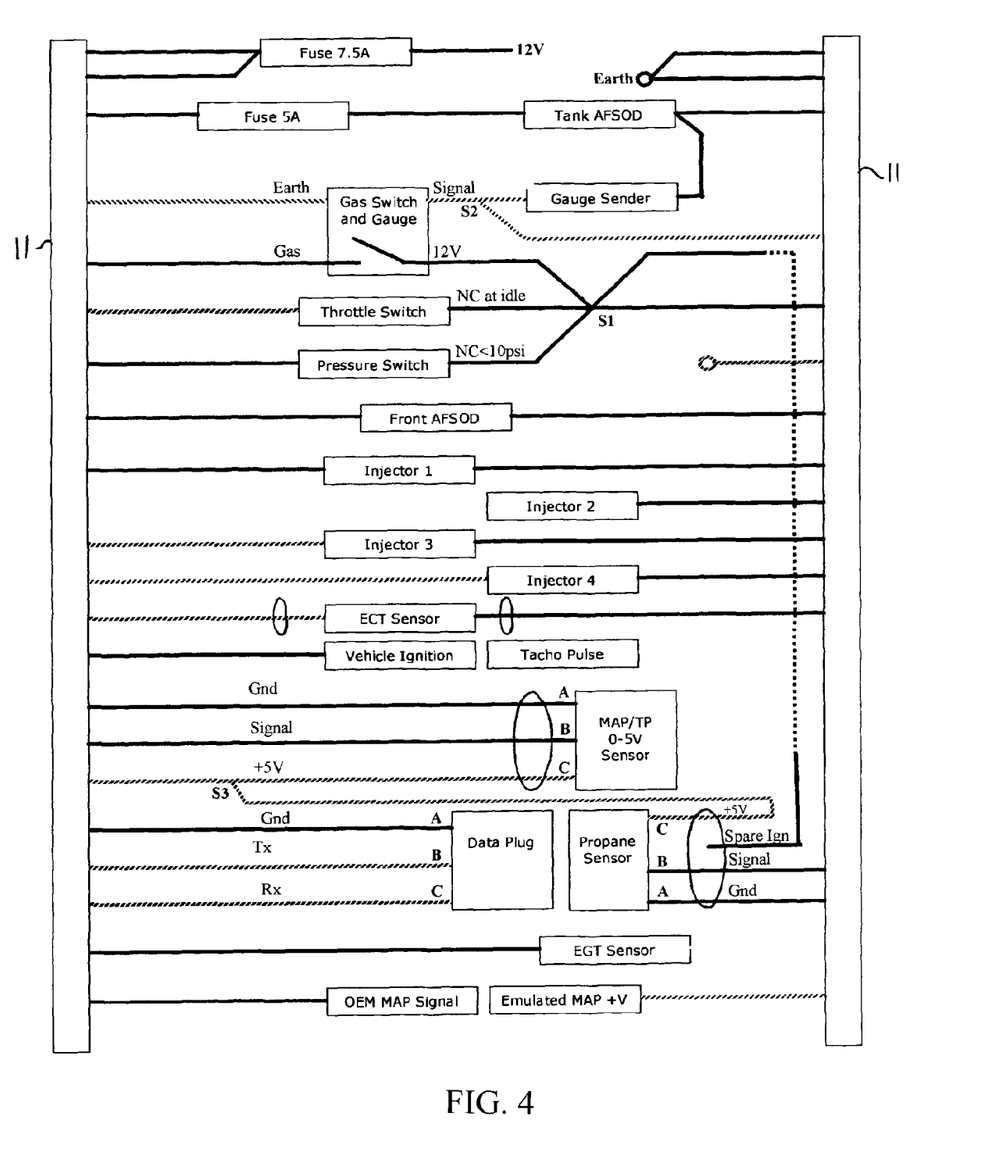
FIG. 4 is a wiring diagram of the system of FIG. 1.
Figure 5:
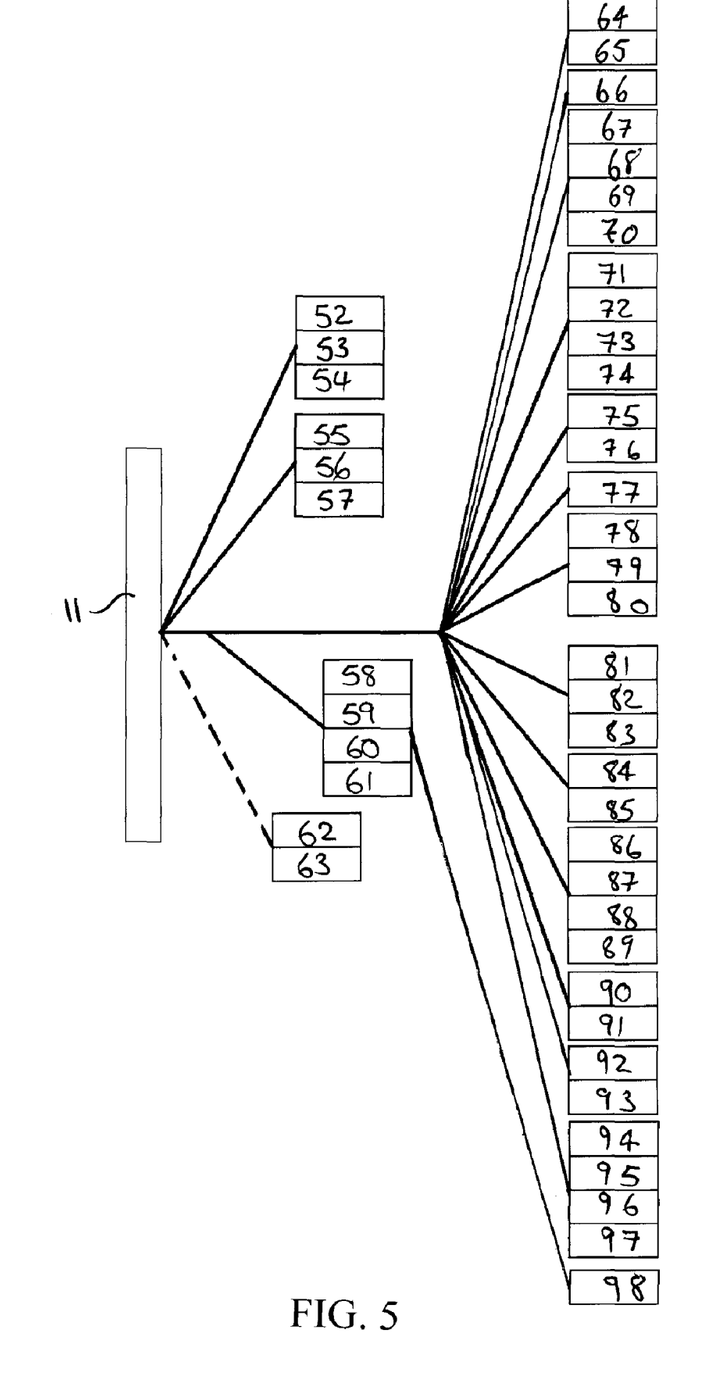
FIG. 5 is a harness diagram of the system of FIG. 1.

A circuit wiring diagram for the connector 11 of the system of FIG. 1 is illustrated in FIG. 4. A corresponding harness diagram is illustrated in FIG. 5. In this Figure, the connector 11 is illustrated as connected to components of the system. Data plug outputs 52, 53, 54 are provided, together with engine body earth connections 55, 56 and a means of selecting a supply voltage 57. Fuses 58, 59 provide protection from the battery and fuses 60, 61 protect an automatic gas shut off device. A connection to an exhaust gas temperature sensor 62, 63 is provided.

The connector 11 includes connections to control various system 30 components (some not illustrated) such as the automatic gas shut off device positive and negative connections 64, 65 and a tachometer (RPM) pulse output 66. Control for four separate LPG gas injectors (not illustrated) is provided by outputs 67 to 74.

The connector 11 also includes a connection to a pressure switch signal output 75, 76, vehicle ignition output 77 and an MAP/TP sensor 78, 79, 80. The connector 11 also includes LPG storage tank automated fuel shut-off device connections 81, 82, 83 and OEM and emulated MAP signal connections 84, 85. The connector 11 outputs 86, 88 provide an LPG gas gauge connection and outputs 89, 89 respectively provide a 12V switch and an LPG flow selector.

A connection to a throttle switch 90, 91 is provided via connection 11. Connections 92, 93 provide an output to an engine coolant temperature (ECT) sensor, and a measured propane sensor 94, 95, 96, 97 connection.

Figure 6:
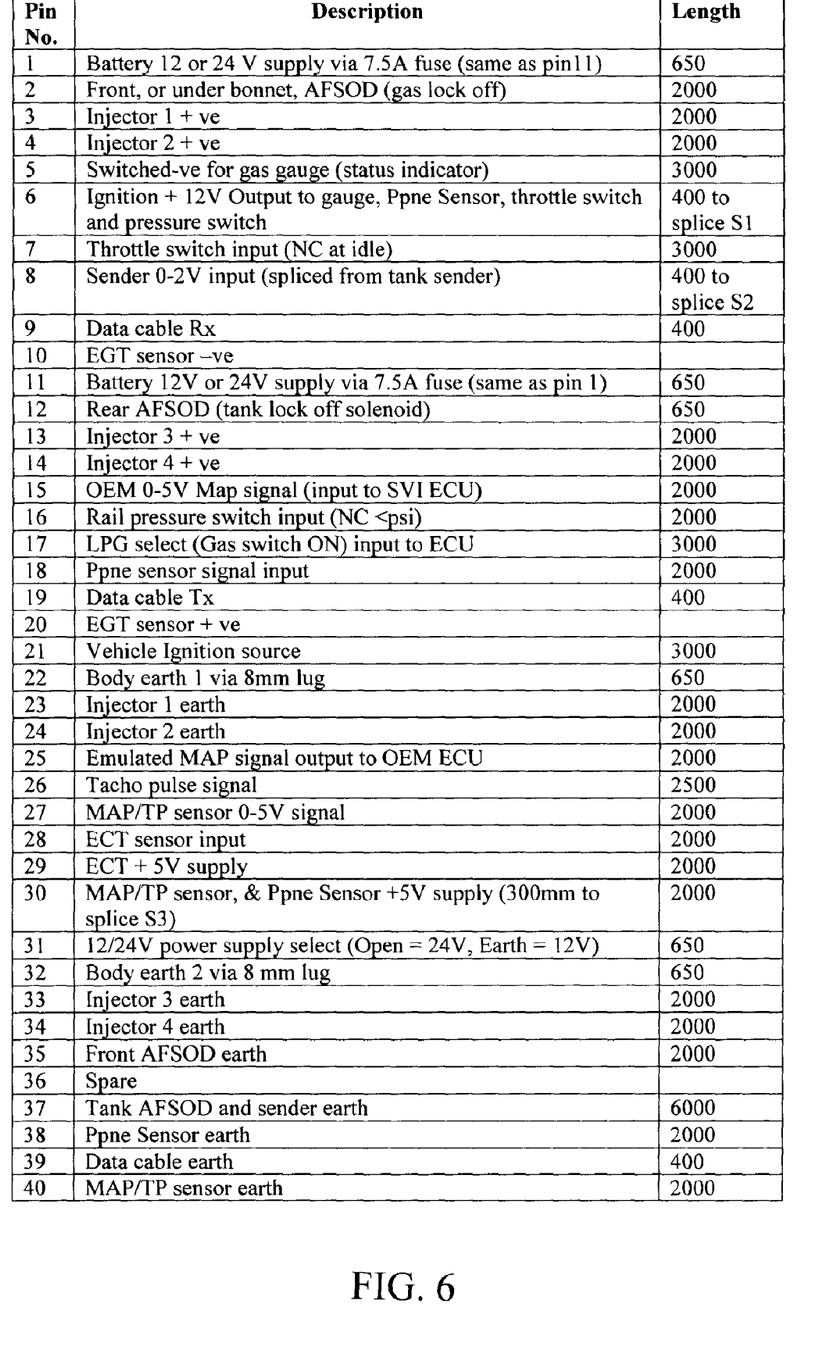
FIG. 6 is a table providing pin-out descriptions of the wiring and harness diagrams of the system of FIG. 1.

FIG. 6 presents a table providing pin-out descriptions of the wiring and harness diagrams of FIGS. 4 & 5. The circuit board 10 of the embodiment of FIG. 1 operating the system 30 illustrates various components including a connector 11, microprocessor 39, capacitors 110, 111, 112, 123 having capacities of 0.1 µF, 10 µF, 1 µF and 470 µF respectively. High voltage capacitors 133 are also illustrated.

The circuit board 10 also schematically illustrates resistors 117, 119, 124, 128, 129, 131 having capacities of 10 kω, 4.7 kω, 920ω, 1 kω, 33 kω and 100ω respectively. Also illustrated are the following components: Zener diodes 113; voltage regulator 114; voltage relays 115, 116 the latter being a quad channel high-side relay; diodes 118; communications transceiver 120 being a MAX3232CSE; under voltage sensing circuit 121; serial memory 122 as an 25LC1024 integrated circuit; a cold compensated K-type thermocouple to digital converter 125; hex inverting Schmitt trigger 126; digital to analog converter 127; 5A fuses 130; and RS 232 communications port 132.

In the illustrated embodiment, the system for performing the method of injecting LPG gas into a diesel fuel engine includes an automated LPG fuel shut-off valve measured from a signal provided by an electrical output pulse from an engine regulator. In the absence of this electrical signal, LPG valve is shut as the engine is not running. When calibrating the system, the engine revolutions per minute of the engine (REVS$_{current}$) at predetermined revolutions from a minimum value at engine idle (REVS$_{min}$) to a maximum value (REVS$_{max}$) at wide open throttle are measured and the corresponding LPG gas injection rate to maintain 0.35% LPG gas of the volume of the air intake stream is measured.

The same step is repeated in respect of measuring the load of the engine (Load$_{current}$) at predetermined loads from an unloaded engine at idle (Load$_{min}$) through to a maximum loaded engine (Load$_{max}$) and again the desired gas injection rate is measured. It will be appreciated that a minimum gas injection rate (GAS$_{min}$) corresponds to an idling engine under zero load while maintaining a 0.35% LPG concentration in the air intake stream.

In the embodiment of FIGS. 1 to 6, the LPG gas injection rate (GAS$_{inject}$) is characterised for predetermined engine REVS (REVS$_{current}$) and load (Load$_{current}$) measurements stored electronically as points of reference. In this embodiment, the value of the rate of LPG gas injection (GAS$_{inject}$) into the air intake stream is governed by the equation:

$$GAS_{inject} = \left[\left[\frac{1}{2}\left(\left(\frac{Load_{current} - Load_{min}}{Load_{max} - Load_{min}}\right) + \left(\frac{REVS_{current} - REVS_{min}}{REVS_{max} - REVS_{min}}\right)\right)\right] * (GAS_{max} - GAS_{min})\right] + GAS_{min}$$

In this equation, GAS$_{max}$ is the required gas injection rate under maximum engine REVS and maximum Load and GAS$_{min}$ is the gas injection rate under minimum engine REVS and minimum or zero Load.

The engine REVS is determined by means of a measurement of the output of the diesel fuel engine alternator or other engine signal source. This provides a signal directly proportional to engine REVS. The diesel fuel engine load (Load$_{current}$) is measured via a corresponding measurement of manifold absolute pressure sensor. The sensor output is directly proportional to the engine load.

However, it will be appreciated that the engine REVS can be measured by any other preferred means and that the engine load may also be measured by other means such as by an engine turbo charger pressure sensor, an exhaust temperature sensor, throttle positioning sensor and/or an exhaust nitrous-oxide gas sensor, for example. Furthermore, the above equation can be modified to characterise the desired gas injection rate accordingly.

Figure 7:
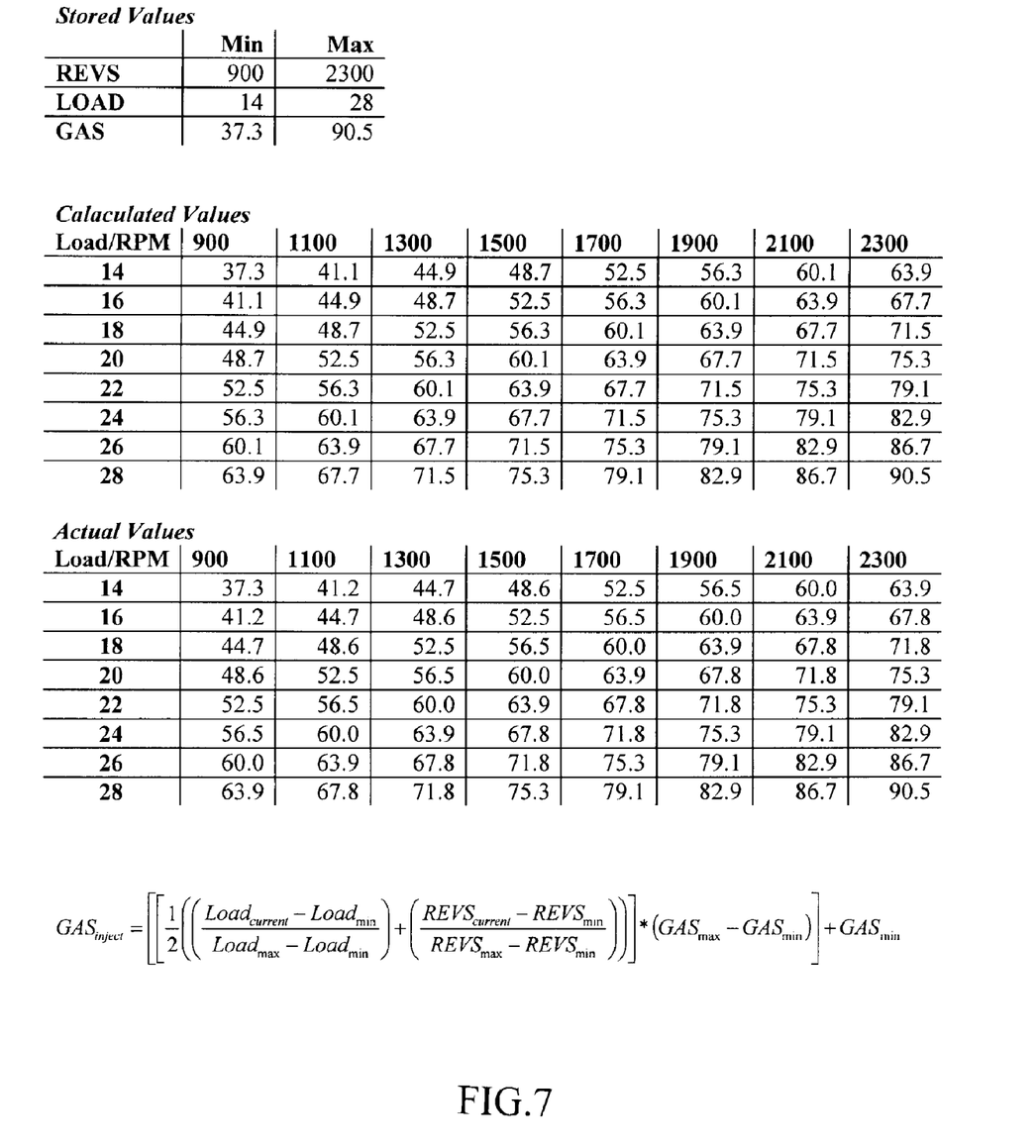
FIG. 7 illustrates a look up table and corresponding determining formula for gas injection rates of the system of FIG. 1.

FIG. 7 illustrates a look up table of LPG gas injection rates as a function of engine REVS and Loads. The look up table is characterised by the above equation. For an idling engine under zero or minimum load (and minimum REVS), the injected LPG gas rate corresponds to GAS$_{min}$. This occurs also in response to a signal from a throttle switch which indicates deceleration, braking and/or an idle condition. In a like manner, the LPG injection system is disable in response to a signal from an LPG tank sensor indicating exhaustion of the LPG.

In this embodiment, it will be appreciated that the system can be calibrated or re-calibrated as desired by measuring the required gas injection rates over the load and REVS ranges so as to maintain a 0.35% volume of LPG gas concentration in the air intake stream and storing these rate values in a look up table accordingly.

In the embodiment of FIGS. 1 to 6, it will be appreciated that system inputs corresponding to manifold pressure, engine REVS, etc. are connected to the apparatus of FIG. 1. This apparatus has output to control both the supply of LPG gas but also the rate of injection thereof into the air intake stream.

It will be appreciated that the embodiments of the present invention is advanced over the prior art for at least important reasons. Firstly, the present invention can be "auto-tuned" by use of a third variable against engine REVS and load to determine the correct rate of gas injection to maintain the air intake volume with 0.35% LPG gas. It will be further appreciated that LPG gas can be substituted with any preferred combustible gas such hydrogen, natural gas or other flammable gas. The third variable measured in the embodiments of the present invention is the percentage LPG gas in the air intake volume, however, diesel flow, air flow, NOx, oxygen or temperature may all suitably be used as the third variable.

Once the three variables are known, the correct gas injection rates can be generated and a map or reference points also generated.

The second advantage over the prior art is the use of the above gas injection equation. Instead of necessarily using a system map or table containing possibly hundreds of points, two points are stored (idle and another point which is greater than idle) and the gas injection rate is calculated using the above equation. The advantage of this is instead applying relatively significant time to measure all these hundreds of values, the present invention requires the measurement of just two. The use of a model equation is also more accurate than using a look-up table because it can calculate the exact value instead of picking the closest point on the map.

For example, it will be appreciated that if LPG usage was sinusoidal then the above equation would also be sinusoidal and a map would be a square wave. Also, although in the embodiment the gas LPG injected into the air intake stream is sampled using a propane sensor, injection directly into the manifold can be provided and the level of LPG gas in the air intake stream is measured using testing the NOx levels in the exhaust. Of course, hydrogen or aquagen, for example, could be injected into the diesel engine manifold and the NOx levels measured in the exhaust to determine the correct gas injection rates. Such a system is envisaged for water to be used instead of LPG for fuel.

It will be appreciated that in other embodiments of the invention, not illustrated, that the LPG gas injection rate ($GAS_{inject}$) is characterised for predetermined engine REVS ($REVS_{current}$) and load ($LOAD_{current}$) measurements stored electronically as points of reference. In alternative embodiments, the rate of LPG gas injection ($GAS_{inject}$) into the intake stream is governed by the equation:

$$GAS_{inject} = \left[ \left[ \left( N \left( \frac{Load_{current} - Load_{min}}{Load_{max} - Load_{min}} \right) + M \left( \frac{REVS_{current} - REVS_{min}}{REVS_{max} - REVS_{min}} \right) \right) \right] * (GAS_{max} - GAS_{min}) \right] + GAS_{min}$$

In this governing equation, the variables N and M are positive and satisfy the equation N+M=1. In this way, the relative contributions to the $GAS_{inject}$ can be predetermined as preferred for each of N and M being 0 or greater but not greater than 1. The weightings N and M are chosen depending on preferences, for example, N=0.4 and M=0.6 in the case of a standard turbo diesel vehicle engine. In this way, the $GAS_{inject}$ rate is more heavily weighted upon the engine revolutions than the engine load. In a naturally aspirated diesel engine, N can=0 and M can=1 so that the component of measured load is not considered in the determination of the gas injection rate $GAS_{inject}$. In the case of a stationary diesel engine, it is preferred that only engine load is measured and so N=1 and M=0.

It will be appreciated that any preferred values for N and M can be provided so long as N+M=1. As noted above, it will be appreciated that the equation which combines weightings of measured REVS and load values can be used in the same manner as the embodiment described. That is, the gas injection rate to provide 0.35% concentration of LPG gas in the air-intake can be governed by the use of an equation in which the load and revolution measurements are weighted depending on the engine and application.

As is described herein, the injection of LPG gas into the air-inlet of a diesel fuel engine can be provided in concentrations of between 0.2% to 0.6%. When a concentration of 0.6%, for example, is provided the diesel engine power performance is not improved, however, significantly fewer emissions are generated. The typical diesel engine particulate matter emissions are significantly reduced as compared to when no LPG gas injection is provided. When an LPG concentration at the diesel engine air-intake is 0.35%, for example, then not only are emissions significantly reduced, but the power output of the engine is also increased.

The foregoing describes only one embodiment of the present invention and modifications, obvious to those skilled in the art, can be made thereto without departing from the scope of the present invention.

The term "comprising" (and its grammatical variations) as used herein is used in the inclusive sense of "including" or "having" and not in the exclusive sense of "consisting only of".

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

The invention claimed is:

1. A method of injecting flammable gas into a diesel fuel engine for combustion with diesel fuel therein, the method comprising:
    injecting flammable gas into an air-stream of an engine air intake or manifold;
    measuring the percentage of flammable gas injected into the airstream;
    varying the rate of injection of flammable gas into the airstream in response to the measured percentage of flammable gas therein and injecting the flammable gas at a pre-determined rate so as to maintain a flammable gas concentration in the air intake stream in the range of 0.2% to 0.6% by volume of flammable gas.

2. The method of claim 1, wherein the flammable gas concentration injected in the air intake stream is maintained at substantially 0.35%.

3. The method of claim 1, wherein injecting flammable gas into the airstream of the engine air intake includes injecting the flammable gas upstream of an engine cylinder.

4. The method of claim 1, wherein measuring the percentage of flammable gas mixed into the airstream of the engine intake comprises bleeding a portion of the mixed air intake stream by combusting the flammable gas intake mixture and measuring same with a sensor in the form of a time delayed hot wire sensor.

5. The method of claim 1, wherein the flammable gas is LPG gas, hydrogen gas or natural gas.

6. The method of claim 1, wherein injecting flammable gas into the airstream of the engine air intake includes injecting the flammable gas into the airstream when it is entering or has entered the cylinder.

7. A modified diesel fuel engine comprising:
    an engine air intake or manifold having an air-stream with flammable gas injecting thereto; and
    an efficiency gauge measuring the percentage of flammable gas injected into the airstream;
    wherein the rate of injection of flammable gas into the airstream is varied in response to the measured percentage of flammable gas therein and injecting the flammable gas at a pre-determined rate so as to maintain a flammable gas concentration in the air intake stream in the range of 0.2% to 0.6% by volume of LPG gas.

* * * * *